United States Patent [19]
Koga et al.

[11] Patent Number: 5,690,032
[45] Date of Patent: Nov. 25, 1997

[54] DEVICE FOR PREVENTING REVERSE RUN OF CARRIER OF TROLLEY CONVEYOR

[75] Inventors: Takao Koga, Nabari; Shozo Adachi, Kashiwara, both of Japan

[73] Assignee: Tsubakimoto Chain Co., Osaka-fu, Japan

[21] Appl. No.: 600,612

[22] Filed: Feb. 13, 1996

[30] Foreign Application Priority Data

Feb. 15, 1995 [JP] Japan .................................. 7-049316

[51] Int. Cl.$^6$ .................................. B61B 9/00
[52] U.S. Cl. .................................. 104/172.1; 104/172.4; 188/82.8; 188/82.84; 192/45.1
[58] Field of Search .................................. 104/172.1, 172.3, 104/172.4; 188/82.1, 82.6, 82.8, 82.84; 192/45, 45.1, 415, 41 A

[56] References Cited

U.S. PATENT DOCUMENTS

| | | | |
|---|---|---|---|
| 2,883,023 | 4/1959 | Szady | 192/45.1 |
| 3,116,481 | 12/1963 | Fuchs | 195/45.1 |
| 3,443,672 | 5/1969 | Giese | 188/82.8 |
| 3,515,249 | 6/1970 | King, Jr. | 192/45.1 |
| 3,750,593 | 8/1973 | Zetterlund | 188/82.84 |
| 4,766,987 | 8/1988 | Message | 192/45.1 |
| 5,320,211 | 6/1994 | Sugiura | 104/172.4 |

FOREIGN PATENT DOCUMENTS 57-51157  11/1982  Japan .

*Primary Examiner*—S. Joseph Morano
*Attorney, Agent, or Firm*—Armstrong, Westerman, Hattori, McLeland & Naughton

[57] ABSTRACT

A reverse run prevention device is provided for use in a trolley conveyor having carriers adapted to run and stop on a rail via engagement and disengagement with pusher dogs on a drive chain. The reverse run prevention device includes an over-running clutch built in a running roller of each carrier to prevent reverse run of the carrier. The overrunning clutch prevents the running roller from rotating via reverse direction where a succeeding carrier is released from the drive chain following its coming into contact with a preceding carrier while the motion of the carriers is being stopped.

1 Claim, 5 Drawing Sheets

DEVICE FOR PREVENTING REVERSE RUN OF CARRIER OF TROLLEY CONVEYOR

FIELD OF THE INVENTION

The present invention relates to a device for preventing the reverse run of carriers of a trolley conveyor.

BACKGROUND OF THE INVENTION

Referring to FIG. 6, a prior art trolley conveyor 11 is shown. The prior art trolley conveyor 11 includes a plurality of carriers 12 for carrying goods or articles W to be conveyed.

Each of the carriers 12 is guided on a rail 14 via running rollers 13 and includes a carrier hook 17 engageable with a pusher dog 16 on a drive chain 15 to cause the carrier 12 to run in the direction of the arrow A while the article W is suspended from the carrier 12.

In the event that the carrier 12 on the left-hand side in FIG. 6 (hereinafter referred to as "succeeding carrier") is running while another carrier 12 (hereinafter referred to as "preceding carrier") is stopped in front of the running succeeding carrier 12, the succeeding carrier 12 first approaches the preceding carrier 12 and subsequently causes a locking and releasing lever 18 to run on to a fixing lever 19 of the preceding carrier 12, thereby turning the locking and releasing lever 18 in the counterclockwise direction about a support point or fulcrum 20.

With the above-described angular movement of the locking and releasing lever 18, the carrier hook 17 is pulled downward via a connecting link 21 and eventually disengaged or released from the pusher dog 16. The succeeding carrier 12 is thus released from the drive chain 15.

However, the succeeding carrier 12 may run backwardly in the direction of the arrow C in reaction to bumping or colliding with the preceding carrier 12. When this happens, the locking and releasing lever 18 of the succeeding carrier 12 separates from the fixing lever 19 of the preceding carrier while the motion of the carriers is being stopped. The locking and releasing lever 18 is allowed to turn by its own weight in the direction of the arrow B, thereby turning the carrier hook 17 in the counterclockwise direction. The carrier hook 17 will therefore be engaged or caught by the next pusher dog 16 while in motion. Thus, the succeeding carrier 12 is advanced again and approaches the preceding carrier 12.

If the foregoing behavior occurs repeatedly (this phenomenon being referred to, according to this invention, as "chattering"), the pusher dog 16 and the carrier hook 17 will generate unpleasant noises and the article W being conveyed will sometimes be damaged due to the shock or impact forces applied thereto.

In addition, a sensor (not shown) disposed by the side of the rail 14 is activated more frequently than is required with the result that an automatic control unit may cause malfunctioning.

In view of this, a device for preventing reverse run of a carrier is disclosed in Japanese Utility Model Publication No. 57-51157 as an example of chattering prevention devices.

Referring to FIG. 7, the disclosed reverse run prevention device of Japanese Utility Model Publication No. 57-51157 includes a brake cam 22 rotatably mounted on each carrier 12 by means of a fulcrum pin 22A.

The brake cam 22 includes an arc-shaped brake surface 23 facing a guide track or surface of the rail 14. In profile, the brake cam 22 has a varying radius about the fulcrum pin 22A which increases gradually from the forward end toward the rear end.

While the carrier 12 is going forward, the brake cam 22 lightly contacts the rail 14. However, when the carrier 12 is caused to run in the reverse direction, the brake surface 23 comes into frictional contact with the rail 14. Thus, a frictional resistance is produced so that the brake cam 22 is active to exert a braking force on the carrier 12 between the rail 14 and the carrier 12 to prevent reverse run of the carrier 12.

When the carrier 12 is stopped, it moves back from the position as shown, by the phantom lines to the position indicated by the solid lines.

The reverse run prevention device of the foregoing construction, however, has various problems described below.

Since the braking force exerted on the carrier to prevent the carrier from running in the reverse direction results from the frictional resistance produced when the brake surface 23 is forced against the rail 14, the brake surface 24 becomes worn out during a long period of use and, hence, fails to achieve the intended reverse run preventing function.

To secure positive contact between the brake cam 22 and the guide surface of the rail 14, the brake cam 22 needs to have its setting position adjusted. However, an adjustment to the brake cam setting is tedious and time-consuming.

While the brake cam 22 is acting between the rail 14 and the carrier 12, the carrier 12 is maintained in a tilted condition with its rear end spaced vertically (i.e., floating) from the rail 14. When the carrier 12 is moved forward again, the floating rear end of the carrier 12 drops onto the rail 14. This tends to damage the article being conveyed due to the impact force exerted thereon.

SUMMARY OF THE INVENTION

The present invention seeks to provide a solution to the foregoing problems by providing a reverse run prevention device to a trolley conveyor which includes a carrier adapted to run and stop on a rail via engagement and disengagement with a pusher dog provided on a drive chain. The reverse run prevention device includes an over-running clutch built in a running roller of the carrier for preventing reverse run of the carrier.

In operation, the carrier is dragged by the drive chain via locking engagement with the pusher dog to convey the article W. When the movement of the carrier is stopped, the carrier is released from the chain by an external operation.

The carrier, thus released from the chain, continues stopping at the same stop position during which time the succeeding carrier engaged is dragged by the drive chain via locking engagement with another pusher dog and approaches the preceding carrier, which is being stopped, from behind. Subsequently, the succeeding carrier comes into contact with the preceding carrier whereupon the succeeding carrier is released from locking engagement with the pusher dog and hence is disengaged from the drive chain.

The succeeding carrier, thus released from the drive chain, tends to go back in the reverse direction as a reaction to colliding with the preceding carrier. The running rollers of the succeeding carrier also tend to rotate in the reverse direction.

However, since the running rollers are each equipped with a built-in over-running clutch to prevent reverse rotation of the associated running roller, reverse rotation of the running rollers does not take place.

Accordingly, the succeeding carrier is stopped at that position without displacement or running in the reverse direction.

DETAILED DESCRIPTION OF THE INVENTION

Figure 1:
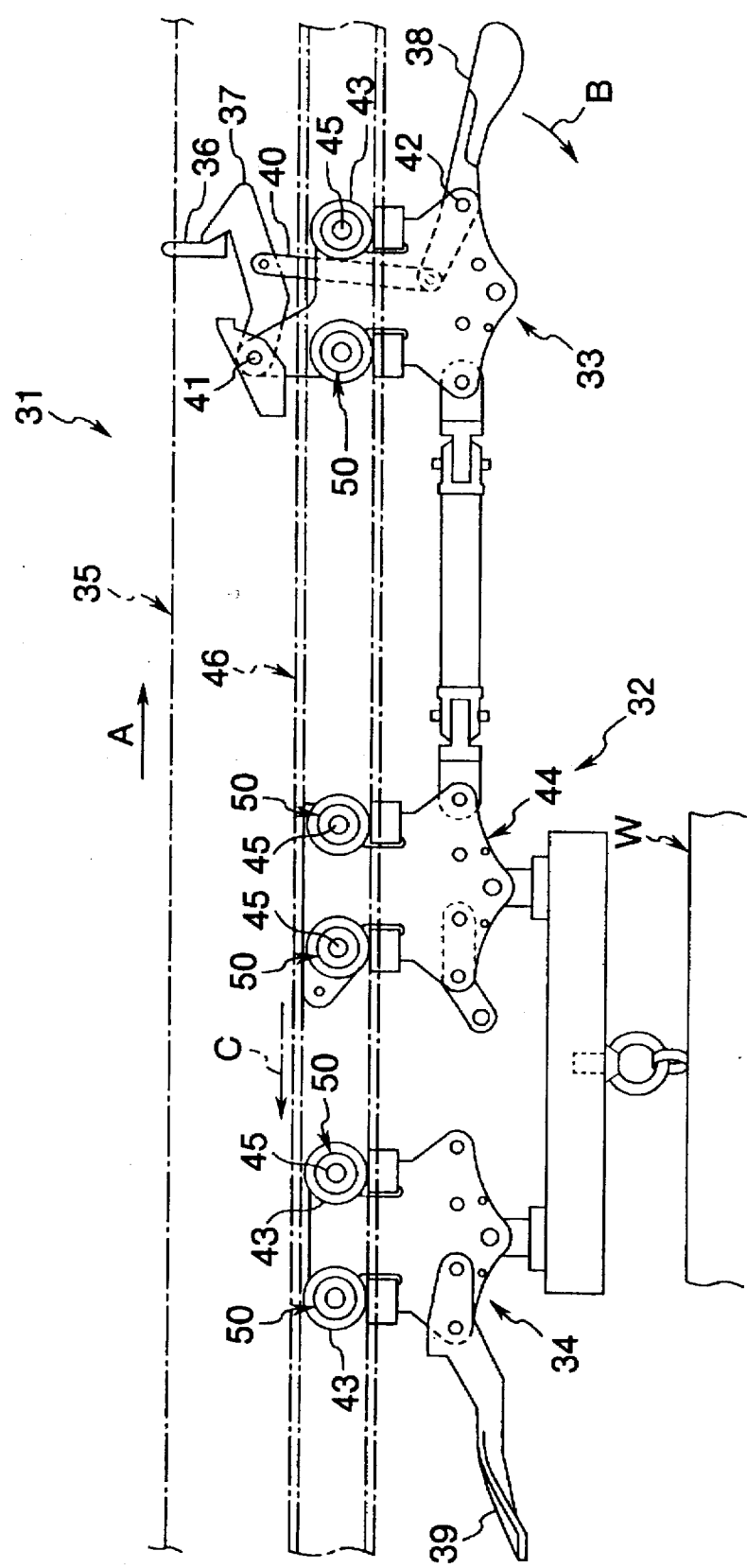
FIG. 1 is a front elevational view of a trolley conveyor equipped with a reverse run prevention device according to an embodiment of the present invention.

An embodiment of the present invention will be described below with reference to FIGS. 1 through 5.

A trolley conveyor 31 includes a plurality of carriers 32 for carrying or conveying a corresponding number of articles W to be conveyed while the articles W are suspended from the corresponding carriers 32.

Each of the carriers 32 includes a front running member 33, an intermediate running member 44 and a rear running member 34.

The carrier 32 also has a carrier hook 37 releasably engageable with a pusher dog 36 on a drive chain 35 continuously running in the direction of the arrow A, an engagement and disengagement lever 38 for engaging and disengaging the carrier hook 37 with the pusher dog 36 via a connecting link 40, and a plurality of running rollers 43 adapted to run on, and along, a rail 46.

The carrier hook 37 is rotatably connected to a fulcrum pin 42 to the front running member 33.

The engagement and disengagement lever 38 is rotatably mounted on the front running member 33 by means of a fulcrum pin 42 and normally urged by its own weight to turn in the direction of the arrow B shown in FIG. 1.

An over-running clutch 50 is press-fitted between each of the running rollers 43 and a corresponding one of the support shafts 45 rotatably supporting the running rollers 43 on the front, intermediate and rear running members 33, 44, 34. The over-running clutch 50 prevents reverse rotation of the associated running roller 43 to prevent the carrier 32 from running in the reverse direction. In the illustrated embodiment, the over-running clutch 50 is provided to each and every running roller 43. However, it is not necessary to provide all of the running rollers with an over-running clutch 50. Rather, an over-running clutch 50 should be provided to at least one running roller 43.

Figure 2:
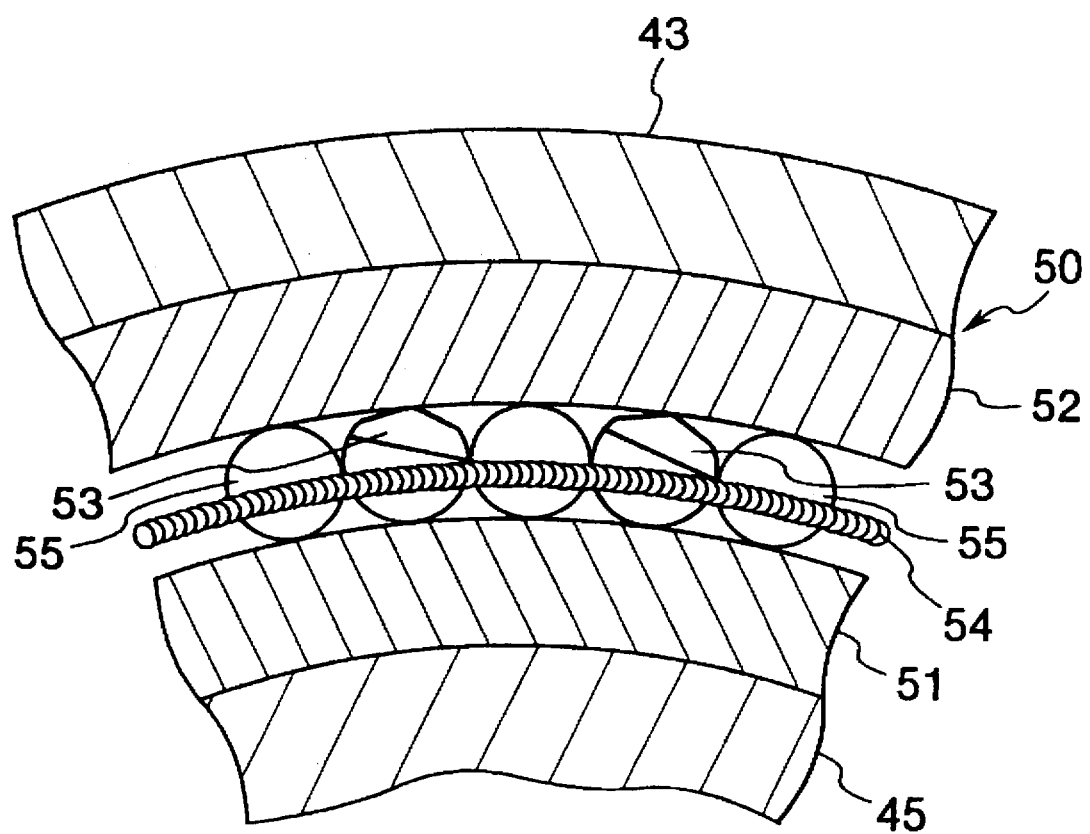
FIG. 2 is a partial front sectional view of an over-running clutch.
Figure 3:
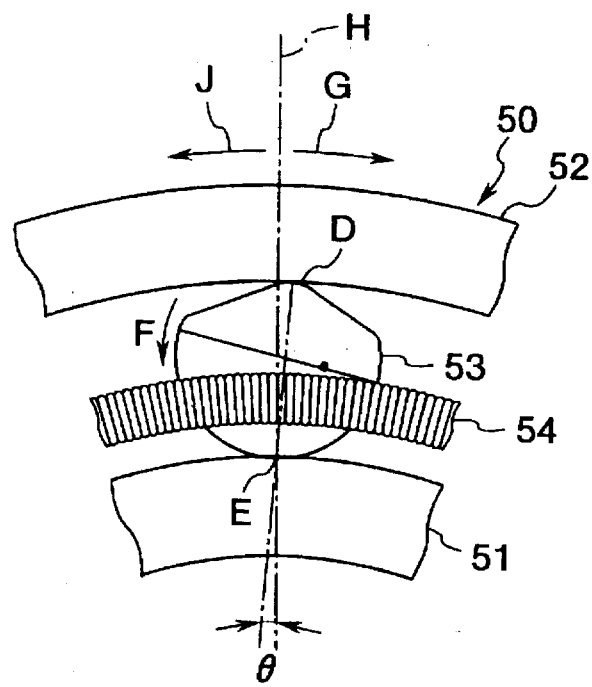
FIG. 3 is a view illustrative of the operation of the over-running clutch.
Figure 4:
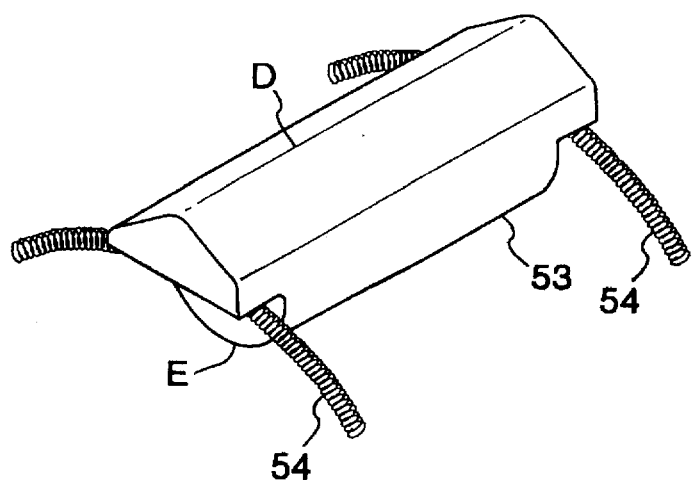
FIG. 4 is a perspective view showing a cam and springs in the over-running clutch.

Referring to FIG. 2, the over-running clutch 50 includes an inner race 51 having an inner peripheral surface press-fitted with the support shaft 45, an outer race 52 having an outer peripheral surface press-fitted with the running roller 43, a plurality of cams 53 disposed between the inner race 51 and the outer race 52, a pair of ring-shaped springs 54, 54 acting on the cams 53 to exert thereon a rotational moment in the direction of the arrow F shown in FIG. 3 so as to urge the cams 53 into light contact with the inner and outer races 51 and 52, and rollers 55 arranged alternately with the cams 53 to keep the alignment between the inner and outer races 51 and 52 and sustain radial loads.

The inner race 51 is press-fitted over the support shaft 45 fixed to the carrier and hence is nonrotatable.

The cams 53 make contact with the outer race 52 and the inner race 51 at two portions D and E, respectively. The line interconnecting these portions D and E is at a constant angle (θ=strut angle) relative to a common centerline at the inner and outer races 51, 52. This angle is set to a value at which the outer race 52 is allowed to rotate in one direction.

The over-running clutch 50 operates as described below.

When the carrier 32 starts running in the direction of the arrow A, the outer race 52 turns in the direction of the arrow G, together with the associated running roller 43 whereupon the portions D and E of the cams 53 are brought out of contact with the outer race 52 and the inner race 51, respectively. Accordingly, the outer race 52 and the associated running roller 43 are able to rotate, as a single unit, in the direction of the arrow G while they are supported by the rollers 55 on the support shaft. Thus, the over-running clutch 50 permits the carrier 32 to run in the direction of arrow G.

In the case where the carrier 32 is caused to run in the reverse direction indicated by the arrow C, the outer race 52 turns in the direction of the arrow J together with the associated running roller 43 whereupon the cams 53 are immediately caught between the outer race 52 and the inner race 51 at the portions D and E to thereby lock the outer race 52 in position against rotation in the direction of the arrow J. Accordingly, rotation of the running roller 43 in the reverse direction is prevented. Thus, the over-running clutch 50 prevents the carrier 32 from running in the reverse direction indicated by the arrow C.

Then, operation of the trolley conveyor 31 will be described below.

The carriers 32 each conveying an article W suspended therefrom are driven to run with the respective carrier hooks 37 engaged by the pusher dogs 36 of the drive chain 35. When one carrier 32 arrives at a stop position, the carrier hook 37 is disengaged from the pusher dog by an external operation and hence is stopped at the stop position.

The carrier 32 thus released from the drive chain 35 continues stopping at same stop position, while the next succeeding carrier 32 approaches the stopped carrier 32 from behind because it is still engaged by the drive chain 35.

Figure 5:
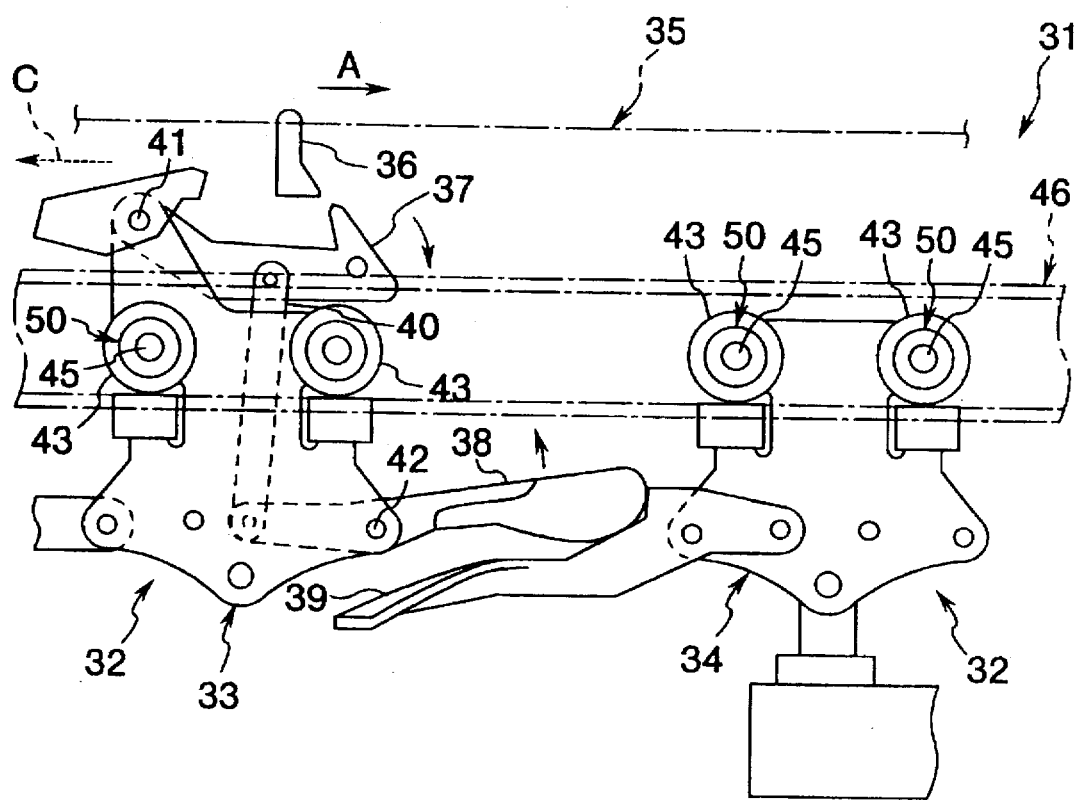
FIG. 5 is a view illustrative of the condition in which the succeeding carrier of the trolley conveyor shown in FIG. 1 is just stopped and comes into contact with the preceding carrier.
Figure 6:
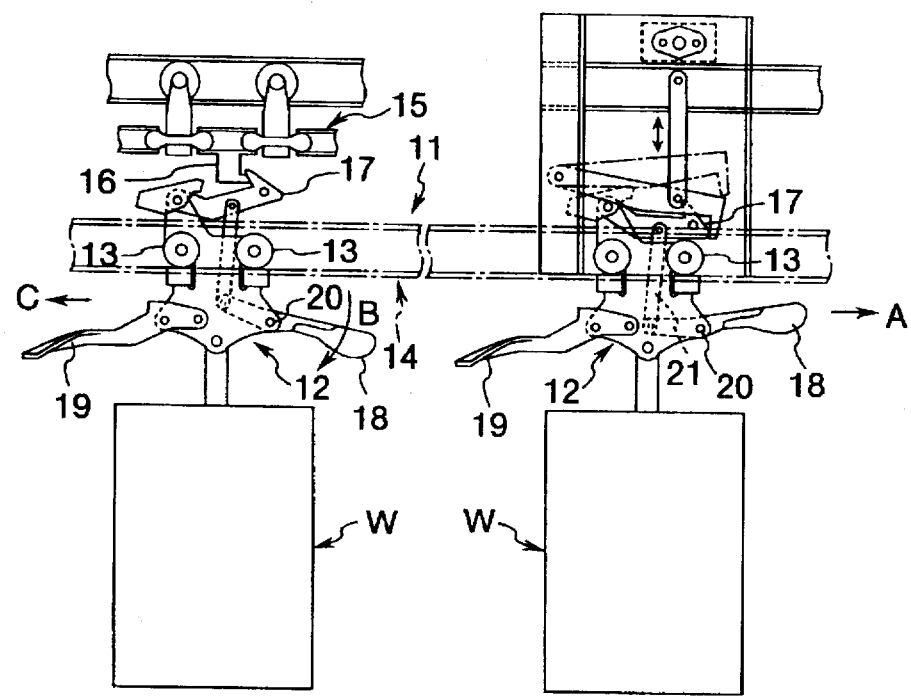
FIG. 6 is a front elevational view of a conventional trolley conveyor.
Figure 7:
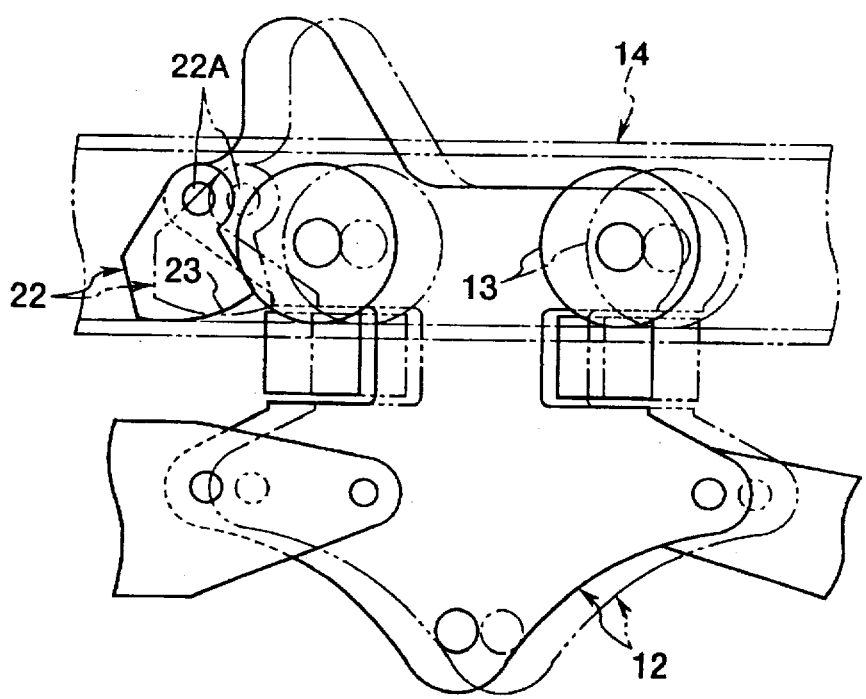
FIG. 7 is a view illustrative of the condition in which the succeeding carrier in the conventional trolley conveyor shown in FIG. 6 is prevented from running in the reverse direction.

The engagement and disengagement lever 38 of the front running member 33 of the succeeding carrier 32, which is shown on left-hand side in FIG. 5, comes into contact with the fixing lever 39 provided on the rear running member 34 of the preceding carrier 32 and then disengages the carrier hook 37 of the succeeding carrier 32 from the pusher dog.

As a result, the succeeding carrier 32 is released from the drive chain 35.

On the other hand, the drive chain 35 is continuously running without regard to the carriers 32.

The succeeding carrier 32 released from the drive chain 35 tends to move back as a reaction to colliding with the stopped preceding carrier 32 from behind.

However, since each running roller 43 of the carrier 32 is equipped with an over-running clutch 50 to prevent the running roller 43 from rotating in the reverse direction, the succeeding carrier 32 is prevented from running in the revere direction and stops at that position where it is released from the drive chain 35.

The reverse running can thus be avoided. In this instance, since the engagement and disengagement lever 38 of the succeeding carrier 32 is held in contact with the preceding carrier 32 to keep the carrier hook 37 from accidentally moving into engagement with the drive chain 35, forward movement of the succeeding carrier 32 does not take place.

Thus, the succeeding carrier 32 is free from chattering.

Although the trolley conveyor in the illustrated embodiment includes three running members, two or one running member may be used.

The trolley conveyor in the embodiment described above is of the overhead type in which the articles are conveyed in a suspended condition. The trolley conveyor may be of the floor type running on a rail installed on or below floor level while the articles are carried on the conveyor.

The reverse run prevention device of this invention includes an over-running clutch built in a running roller for preventing the running roller from rotating in the reverse direction to thereby prevent reverse running of the carrier. The device does not require a separate brake cam adapted to engage the guide track or surface of a rail to prevent the carrier from running in the reverse direction and, hence, can be easily assembled with the carrier.

In addition, the reverse run prevention device of this invention, including an over-running clutch built into the running roller can make it unnecessary for attachment of a conventional brake cam which would be required to ensure that a brake surface of the brake cam acts on the rail surface at an accurate wedging position when the carrier is caused to run in the reverse direction. This means that an in-situ height adjustment taken to secure reliable operation of the brake can, on the carrier relative to the rail surface, be omitted. Furthermore, since braking is effected without reliance on wedging of the brake cam into the rail surface, a reliable braking operation can always be achieved even when the guide surface of the rail and rolling surfaces of the running rollers are worn out.

By the use of the reverse run prevention device of this invention which includes the over-running clutch built in the running roller, the carrier is not forced to take a tilted or floating posture to avoid reverse run. It is therefore possible to restart the forward movement of the carrier smoothly without damage which would otherwise be caused due to the impact force produced when the carrier falls down onto the rail.

What is claimed is:

1. Trolley conveyor system having a rail, a carrier containing running rollers adapted to rotatably engage said rail, a drive chain having an engageable and disenageable pusher dog operative for selectively connecting and disconnecting said drive chain with respect to said carrier, and means for preventing reverse run of said carrier on said rail, said reverse run preventing means including, with respect to at least one of said running rollers, a support shaft for rotatably supporting said one running roller and an over-running clutch, said over-running clutch comprising:

an outer race installed on an inner surface of said running roller, an inner race fixedly secured to said support shaft, a plurality of circumferentially spaced rollers interposed between an inner surface of said outer race on an outer surface of said inner race, a cam disposed between adjacent rollers, said cam, intermediate its axial ends, containing a first portion having an effective width less than the space between said inner surface of said outer race and said outer surface of said inner race and a second portion having an effective width defined by surface portions on opposite sides of said cam greater than the space between said inner race and said outer race, said surface portions being interconnected by a line having a constant angular displacement with respect to a common centerline of said races, an extension of at least one axial end of said cam having a chordal surface extending transverse to said line, and an annular spring disposed between said chordal surface and said outer surface of said inner race and operative to bias said surface portions into sliding contact with said race surfaces, whereby said cam is effective to permit relative rotation between said races in one direction and to prevent relative rotation between said races in an opposite direction.

* * * * *